United States Patent [19]

Gray et al.

[11] Patent Number: 5,676,741

[45] Date of Patent: Oct. 14, 1997

[54] METAL FREE EMULSION POLYMERS FOR HIGH PERFORMANCE AQUEOUS COATINGS

[75] Inventors: Richard Thomas Gray, Levittown; Joseph Michael Owens, Hatboro; Harrison Scott Killam, Holland, all of Pa.

[73] Assignee: Rohm and Haas Company, Philadelphia, Pa.

[21] Appl. No.: 700,067

[22] Filed: Aug. 19, 1996

Related U.S. Application Data

[62] Division of Ser. No. 464,844, Jan. 16, 1990, Pat. No. 5,574,090.
[51] Int. Cl.[6] .............................. C09G 1/16; C08L 31/02; C08L 33/02; C08L 33/08
[52] U.S. Cl. ...................... 106/3; 524/555; 524/558; 524/561
[58] Field of Search .............................. 106/3; 524/555, 524/558, 561

[56] References Cited

U.S. PATENT DOCUMENTS

| | | | |
|---|---|---|---|
| 4,469,848 | 9/1984 | Hooper et al. | 106/3 |
| 4,704,429 | 11/1987 | Hackett | 524/560 |
| 5,081,166 | 1/1992 | Kiehlbauch et al. | 523/201 |

FOREIGN PATENT DOCUMENTS 159310  12/1989  Japan.

*Primary Examiner*—Joseph L. Schofer
*Assistant Examiner*—Wu C. Cheng
*Attorney, Agent, or Firm*—David T. Banchik

[57] ABSTRACT

Metal-free polymer compositions are disclosed which contain selectively swellable emulsion polymer functionalities and which are cross-linked before film formation to an extent that still allows the polymers to form a film upon application, which film is removable with a stripper solution containing swellant for the polymer functionality. When the polymers are formulated into sacrificial coatings, the polishes produce detergent resistant and removable finishes.

5 Claims, No Drawings

METAL FREE EMULSION POLYMERS FOR HIGH PERFORMANCE AQUEOUS COATINGS

This is a divisional of application Ser. No. 07/464,844, filed Jan. 16, 1990 which is now U.S. Pat. No. 5,574,090.

BACKGROUND OF THE INVENTION

Polishes are intended to be sacrificial coatings which protect the underlying substrate by sacrificially accepting and resisting marks, soils, scuffs, abrasion, and scratches encountered in the normal use of the substrate, and, when the useful or aesthetic life of the protective film has expired, the polish can be easily removed from the substrate, to be replaced with a new coating. Historically, removability has been provided for floor polishes by incorporating high levels of acid-functionalized monomers in the polymeric polish vehicle, or by the use of high levels of relatively high acid functionalized Alkali Soluble Resins (ASR's) as formulation adjuncts. However, if sufficient acid functionality was added to the polish polymer or polish formulation so that adequate long-term removability was attained, the resistance of the polish film to scrubbing with alkaline detergent solutions was greatly compromised. If the acid functionality in the polish polymer or the amount of ASR in the formulation was restricted to allow for aggressive cleaning operations, then long-term removability was greatly compromised.

A solution to this detergent resistance/removability balance problem was provided by the technology taught by U.S. Pat. No. 3,900,438, granted Aug. 19, 1975 to R. E. Zdanowski which used polish polymers containing pendant amino functionality, rather than acid functionality, so that the polish film is inherently inert to attack by alkaline detergent solutions. Removability in that system was provided by using an acidic stripper solution which forms hydrophilic salts in the film when the acidic stripper neutralizes the polymeric amines. Hydration of this salt results in swelling of the polish film so that it loses its resistance to mechanical abrasion and its adhesion to the flooring substrate, so the film is readily removed. This solution to the detergent resistance/removability balance problem was not commercially successful because of the high levels of very expensive amino functional monomers that were required to obtain films which were adequately sensitive to the acidic stripper solutions. If lower levels of amino functional monomers were incorporated into the polish polymer backbone, then it was necessary that the stripper solution be based on stronger acids, or more concentrated acid solutions, in order to obtain adequate removability. These alternatives are not acceptable because of the hazards associated with handling these more aggressive solutions, and because of the tendency of the stronger acid solutions to corrode furniture, particularly metal furniture, in the areas to be stripped of polish.

The dilemma of balancing alkaline detergent scrub resistance with long term removability was materially addressed and largely resolved by the now well known technology of latent transition metal complex crosslinking of floor polish polymers and formulations. This technology is taught in U.S. Pat. No. 3,328,325, granted Jun. 27, 1967 to R. E. Zdanowski, U.S. Pat. No. 3,308,078, granted Mar. 7, 1967 to J. R. Rogers and L. M. Sesso, U.S. Pat. No. 3,467,610, granted Sep. 16, 1969 to I. S. Fiarman, et al., U.S. Pat. No. 3,554,790, granted Jan. 12, 1971 to D. R. Gehman, et al., U.S. Pat. No. 3,573,239, granted Mar. 31, 1971 to R. E. Zdanowski, and U.S. Pat. No. 3,711,473, granted Jan. 16, 1973 to C. J. Oliver.

This transition metal complex crosslinking technology is based on the addition of a transition metal (usually Zinc) complex with labile, volatile amine ligands to a preformed emulsion polymer which contains acid-functionalized monomers. As the technology is taught, during the emulsion polymer film formation process the volatile ligands are released from the complex, freeing the metal to react with and crosslink the acid functionality of the polymer by forming ionic or coordinate covalent crosslinking bonds. This crosslinked acid functionality is insensitive to alkali, imparting resistance to alkaline detergents to the polish film. The crosslinks are reversible if an amine (such as ammonia, or preferably a lower alkanol amine) is present in the detergent solution. These modified alkaline detergent solutions are called polish strippers, since they impart removability to the polish film by removing the crosslinking metals and leave the polymeric acid functionality to react with the alkalinity of the detergent solution.

In the commercial practice of this technology it is generally understood that care must be taken in the selection of the metal complex ligands. If the ligand is not sufficiently labile, such as in the case of bi- or poly-dentate ligands (for example triethylene diamine, or ethylene diamine tetra acetic acid), then latent crosslinking of the polymeric acid functionality will not occur during the relatively short time available for polymer and polish film formation. A detergent resistance/removability balance will not be attained. Similarly, if the ligands selected are not sufficiently volatile to be lost from the complex during the film formation process (for example, with diethanol amine or trimethanol amine), then the metal will not be released from the complex and latent crosslinking of the polymeric acid functionality will not take place. The resulting films will not have a detergent resistance/removability balance. Conversely, as discussed in U.S. Pat. No. 3,308,078, if the ligand is too labile, such as in the case of stericly hindered amines (for example triethyl amine, or N,N-diethyl propyl amine), or if insufficient labile metal complexing ligand is present, then precrosslinking of the polymeric acid functionality with metal will occur before film formation. This was found to be undesirable, resulting in an emulsion polymer and polish formulation having an elevated minimum filming temperature (MFT), an increased requirement for organic solvents to act as plasticizing and coalescing agents, polymer emulsion instability, and a polish that did not readily form a tough, coherent, traffic-resistant coating. The lack of a coherent film reduced resistance to marking, soiling, scuffing, and abrasion, and poorer water resistance and detergent scrub resistance.

Although transition metal crosslinking of acid functionalized polish polymers provides a balance of detergent resistance and removability to the polish film, this advantage is offset by the deleterious effects of the metal crosslinking agent or the metal complex on the polish and polymer stability, polymer manufacturing ease and cost, and polish gloss. Furthermore, the high levels of volatile amine ligands charged to the polymer (in excess of the complex stochiometry to shift the complex formation equilibria toward the fully chelated metal so that precrosslinking of the polymer emulsion can be avoided) presents problems in polish formulating, handling, and application in the form of odor, toxicity, and poor polish recoatability. Also, the heavy metals used as the basis for the transition metal complex present environmental hazards in the disposal of unused or contaminated polish, emulsion polymer, and spent stripper solutions which contain removed polish film. Recently, heightened concerns regarding environmental safety and workplace safety have made latent metal crosslinkling less acceptable.

OBJECTS OF THE INVENTION

An object of the invention is the production of a floor polish that is highly resistant to washing with detergents and easily removeable with stripper, which polish does not have the environmental problems associated with metals and volatile amines used in latent metal crosslinking.

A further object of the invention is a floor polish with high acid content that has good detergent resistance.

An additional object of the invention is a floor polish with low acid content that is easily removable.

Another object of the invention is a floor polish with low base content that is removable with dilute solutions of a weak acid stripper.

A further object of the invention is a method of preparing a floor polish containing emulsion polymer having acid functional groups which enables independent selection of (1) a desired degree of detergent resistance, and (2) a desired degree of removability.

SUMMARY OF THE INVENTION

We have discovered that the incorporation of low levels of covalent, or otherwise permanent, intermolecular crosslinks within the particles of an emulsion polymer vehicle, prior to film formation, enables the production of metal-free polymer films having alkaline detergent scrub resistance and yet which are readily removed.

The present invention provides a polymer composition which contains swellable emulsion polymer particles that are crosslinked before film formation to an extent that still allows the polymers to form a film upon application, which film is removeable with a stripper solution containing swellant for the polymer particles. The polymer composition contains a covalent crosslinking agent, such as crosslinking monomer, in an amount such that the composition can be formulated and cast as a film after essentially complete reaction of the crosslinking agent. The polymer also contains an amount of swellable polymer functionality such that when a film of the composition is treated with a chemical swellant the particles expand sufficiently to break interparticle attachments resulting in destruction and/or stripping of the film.

Covalent or otherwise permanent crosslinking of the emulsion particles in the polish vehicle interferes with polish film cohesion and adhesion so that the swelling forces will more easily disrupt the film integrity and adhesion to the substrate, making removal of the film easier. Precrosslinking to produce intraparticle crosslinks in the emulsion polymers results in a selective sensitivity of acid functionality incorporated in the polymer toward swelling, producing severe swelling by ammonia or other amines in the stripper solution, while permitting only modest swelling by the simple alkalinity (general hydroxide) in detergent solutions. This selective swelling by specific reagents provides a balance of resistance to alkaline scrubbing, with easy removability.

The selective sensitivity and selective swelling of precrosslinked polish emulsion polymers means that the alkaline detergent resistance of a polish film can be adjusted independently of the polish film removability. The detergent resistance of polishes formulated from the polymers of this invention is an inverse linear function of the level of acid functional monomers incorporated in the polymer. The selective sensitivity to polish swelling by ammonia or other amines is a linear function of the level of intermolecular crosslinking incorporated in the emulsion polymer. The detergent resistance of polishes based on the polymers of this invention is limited only by the amounts of hydrophylic functionality incorporated in the polymer and formulation, with the minimum levels (and maximum alkaline detergent scrub resistance) being dictated by considerations of the polymer and polish formulation, stability, and polish durability. The maximum amount of acid functionality in the polymer is limited only by considerations of the polish water resistance, detergent resistance and formulation viscosity (polish leveling performance). Removability is variable as a function of the amount of permanent, intermolecular crosslinking in the emulsion polymer, with the minimum level being that which provides efficient polish removability, and the maximum level dictated by consideration of polish solvent demand to form a coherent film.

In one embodiment, this invention provides aqueous emulsion floor polish vehicle compositions which yield metal-free polishes with a balance of alkaline detergent scrub resistance and ammonia, or other amine-containing stripper removability. These polymer compositions include an emulsion copolymer containing from about 3% to about 50% by weight of residues of at least one acidic monomer and from about 0.15% to about 12% by weight of residues of multifunctional monomers capable of forming covalent, or otherwise permanent intermolecular crosslinks in the reaction process to form the copolymer, or are capable of facile post reaction to form permanent crosslinks of the emulsion polymer before film formation. Generally the other monomers in the polish copolymer are from 0% to about 80% by weight of residues of at least one vinyl aromatic monomer, from 0% to about 70% by weight of residues of at least one monomeric vinyl ester in which the acid moiety of the ester is selected from aromatic and substituted aromatic acids and C1 to C18 aliphatic acids, from 0% to about 97% by weight of residues of at least one monomer selected from the acrylic and methacrylic acid esters of C1 to C18 alcohols.

In another embodiment this invention provides aqueous emulsion floor polish vehicle compositions which yield metal-free polishes with a balance of alkaline detergent scrub resistance and acetic acid, or other dilute, weak acid-containing stripper removability. Amino functional polymers have inherent resistance to the alkaline reagents in detergent solutions, and are removable with acid stripper solutions. When these polymeric polish films are pre-crosslinked they are made more removable and are readily stripped with weaker acids, or more dilute acid stripper solutions. This eliminates the need to incorporate high levels of expensive amino-functional monomers in the polymer vehicle. The incorporation of permanent crosslinks in the polymer emulsion enhances the swelling of the polish film by the acidic stripper solution so that removability is more easily accomplished. These polymer compositions include an emulsion copolymer containing from about 3% to about 20% by weight of residues of at least one primary, secondary, or tertiary amino-functionalized monomer and from about 0.2% to about 9% by weight of residues of multifunctional monomers capable of forming covalent, or otherwise permanent intermolecular crosslinks in the reaction process to form the copolymer, or are capable of facile post reaction to form permanent crosslinks of the emulsion polymer before film formation. Generally the other monomers in the polish vehicle copolymer are from 0% to about 80% by weight of residues of at least one vinyl aromatic monomer, from 0% to about 97% by weight of residues of at least one monomer selected from the acrylic and methacrylic acid esters of C1 to C18 alcohols.

DETAILED DESCRIPTION OF THE INVENTION

The polymer particles contain swellable polymer, a polymer that contains functionality which will interact with a swellant to expand the dimensions of the polymer particle or film. This swelling action helps to disrupt the film during the stripping operation. The polymer/swellant pairings are selected based on known interactions between a selected polymer functionality and the corresponding swellant. The preferred swellable polymers swell as a result of interaction of acids with amines. Acid-functional polymers may be used with amine swellants and amine-functional polymers may be used with acid swellants. The most preferred swellable polymers are polymers that contain carboxylic acid functional groups and the most preferred amines are ammonia and the lower alkyl, or lower alkanol amines. With polymers that contain amino-functional monomers, the preferred swellants are the lower alkyl carboxylic acids.

The incorporation of permanent crosslinking in the polish emulsion compositions of this invention imparts a selectivity to the acid functionality of the polymer composition toward swelling by ammonia and other amines that is not shared by other basic, hydroxidic reagents. The mechanism of this phenomenon is not well understood, but it results in free film cubic swell ratios with aqueous ammonia, or aqueous primary and secondary amine solutions, that are five to thirty times larger than those generated with the same free film in aqueous hydroxide salt solutions of equal, or even much higher, pH. This swelling, presumed to be due to the formation of amine salts with the polymeric acid in the polymer matrix of the film, and subsequent hydration or solvation of the salts by water, provides the mechanism for facile polish removability. The polish films based on the precrosslinked emulsions of this invention, when treated with aqueous ammonia or other amine solutions, are sufficiently swollen by imbibing water that their adhesion to the substrate is disrupted, and the swollen film lacks sufficient cohesion and abrasion resistance to withstand the mechanical stresses of the removal process.

Since the film is swollen by ammonia or amine solutions, and not as a simple function of the solution hydroxide ion concentration or pH, the films can be rendered resistant to alkaline detergent scrubbing simply by controlling the amount of acid functionality present in the polymer and in the formulation. The methods for controlling acid functionality in a polish film are currently well understood and commonly practiced in this art.

Another function of the intermolecular crosslinks in the emulsion polymer particles of this invention is to subtly disrupt the intramolecular cohesion of the polish film and the adhesion of the polish to the substrate. This is a subtle phenomenon, since the film adhesion and cohesion must not be so modified that the durability of the polish is degraded. The subtle disruption of film cohesion, however, means that the swelling forces generated by the interaction of the swellable polymeric functionality with the specific reagents of the stripper solution will disrupt the film integrity so that the swollen film loses its integrity and is readily removed.

To provide active sites for interaction of the crosslinked polymer with the ammonia or other amine-containing stripper solution, the polymers preferably contain from 3% to about 50%, based on the total weight of monomers, of at least one acidic monomer. The acid functionality may be incorporated in the polymer by the known means, using an effective amount. More preferably, the amount of acid monomer will be from about 5% to about 30%, based on the total monomers. Examples of acidic monomers are ethylenically unsaturated acid monomers, such as acrylic acid, methacrylic acid, maleic acid and maleic anhydride, itaconic acid, and mixtures thereof.

In another embodiment, permanent crosslinking of the emulsion polymer polish vehicles enhances the sensitivity and effectiveness of swelling of aminofunctional polymer film with an aqueous, acidic stripper solution. As a result, polish removability can be attained with either a lower concentration of amino functionality in the polymer of acid strippable polish polymers using a given stripper solution, or a polymer can be prepared for use with less concentrated, or weaker acid solutions as the selective stripper solution. The presence of permanent crosslinks in the emulsion polymer before polish film formation does not alter the inherent resistance of these amino-functional polymers to removal by alkaline detergent solutions.

To provide active sites for interaction of the crosslinked polymer with the dilute acid-containing stripper solution, the polymers preferably contain from 3% to about 30%, based on the total weight of monomers, of at least one amino monomer. The amino functionality may be incorporated in the polymer by the known means, using an effective amount. More preferably, the amount of amino monomer is from about 5% to about 20%, based on the total monomers. Examples of amino monomers are dimethylaminoethyl (meth)acrylate, t-butylaminoethyl(meth)acrylate, methylaminoethylacrylate, and mixtures thereof.

Crosslinking Monomers

The polymer compositions of this invention contain crosslinking agents, such as crosslinking monomers. These are multi-functional monomers which are capable of forming covalent, or otherwise permanent crosslinks of the polymer molecules in the reaction processes which form the polymers, or they are capable of reacting in or on the preformed polymer emulsion to form crosslinks before the polymeric film is formed. Multi-functional, crosslinking monomers which tend to form inter-molecular crosslinks, rather than intramolecular crosslinks, are preferred, because these are more effective in providing an appreciable selectivity in the amine vs. hydroxide swelling, and these are more effective in providing acceptable film removability at low levels of incorporation in the polymerization mixture. Intramolecular crosslinking reactions are not useful in providing selective sensitivity to the polish film, and they are ineffective in disrupting the polish film cohesion and adhesion. Crosslinking monomers which tend to form intramolecular crosslinks, though useful in practicing this invention, are consumed unproductively in chain extension reactions, chain catenation and ring formation, and "back biting" and chain termination processes.

Because of their greater tendency to form inter-molecular, rather than intramolecular, crosslinks, multifunctional monomers are preferred wherein the reactivity of the functional groups is different, or the reaction of the different functionalities have different activation energies. These monomers can be readily incorporated into the polymer in a first reaction utilizing the more reactive functionality and then subsequently reacted through the lower reactivity functionality after initial polymer chain formation to produce interchain crosslinks. Crosslinking monomers which have only one type of reactive functionality can also be used, but it will generally require more of these monomers to produce the same degree of intermolecular crosslinking. Of course, for a given weight charge of crosslinking monomer to the polymer composition, those multifunctional monomers which have a lower equivalent weight per reactive functional group are more efficient in forming effective intermolecular crosslinks.

For instance, allyl methacrylate (ALMA), a difunctional monomer which polymerizes through both the allyl functionality and the acrylic functionality to form intermolecular crosslinks is preferred at about 0.2% to about 1.5% of the total weight of monomers, and more preferred at about 0.4% to about 1.0% of the total weight of monomers, and most preferred at about 0.5% to about 0.8% of the total weight of monomers. In contrast, divinyl benzene,in which both reactive functional groups are identical, is effective in providing selective swelling and a polish detergent resistance/removability balance at about 5% to about 8% of the total weight of monomers.

Crosslinking multifunctional monomers which can undergo latent crosslinking, or which form crosslinks by some reaction process other than that used in preparing the emulsion polymer, must be reacted to completion (or near completion) before the emulsion polymer forms a film. Crosslinking reactions which occur after film formation will improve the ability of the film to withstand the swelling forces which arise from the interaction of the swellable polymeric acid functionality with the amine reagents, or swellable polymeric amino-functionality with the acid reagents in the stripper solution, retarding or preventing polish removal. Post-crosslinking of the polish film will also serve to strengthen the film cohesion, further complicating the polish removal process. Post-crosslinking processes, after film formation, will serve to improve polish durability and detergent resistance, but, as with the current technology, this is gained at the unacceptable price of poor polish removability.

Although the preferred embodiment includes incorporation of crosslinking monomers during the polymer emulsion preparation, the required crosslinking reactions can occur at any time prior to film formation. In another embodiment, the invention could be practiced by post addition of a crosslinking reagent, such as an aziridine, for example, to a preformed emulsion of acid functional polymer. The source of the crosslinks, or the mechanism of their formation is not germane to the phenomenon of developing selective swelling sensitivity, as long as the crosslinks are created before the polymer emulsion is converted to a film.

Examples of the useful covalent crosslinking monomers include allyl acrylate, allyl methacrylate, butylene glycol dimethacrylate, diallyl maleate, diallyl phthalate, divinyl benzene, hexan-1,6-diol diacrylate, acetylacetoxyethyl methacrylate, methylol methacrylamide, trimethylolpropanetriacrylate, trimethylolpropanetrimethacrylate. This listing is illustrative and other reagents, crosslinking monomers, and crosslinking reaction schemes to produce effective low levels of intermolecular crosslinking in emulsion polymers before film formation will be evident to be within this invention.

Generally the amount of crosslinking monomer is from about 0.15% to about 12% percent by weight, depending on the efficiency of the crosslinking monomer in forming inter-molecular, rather than intra-molecular crosslinks. Usually the amount of crosslinking monomer is from about 0.2 to about 9 percent by weight. Preferably the amount of crosslinking monomer is from about 0.2 to about 5 percent by weight.

It should be recognized that there is a linking relationship between the amount and type of swellable functionality present in the polymer on the one hand and the amount and type of covalent crosslinking agent on the other. The degree to which particle coalescence must be controlled through crosslinking prior to film formation is related to the ability of the amount and type of swellable polymer functionality and swellant to expand the film sufficiently to break interparticle attachments and adhesion to the substrate to allow removal of the film.

A recommended approach to determining the relative amounts of swellable polymer functionality and multifunctional crosslinking agent to use in a given instance is to first start with a basis polymer composition by selecting proportions of monomers through known techniques to meet the specific target performance criteria for the end use, such as relative hardness/softness, chemical resistance, $T_g$, gloss, refractive index, etc. These techniques of polymer design are well known and are set forth for example in *MAINTENANCE CHEMICAL SPECIALTIES*, by Walter J. Hackett (Chemical Publishing CO., Inc.; New York, 1972). The starting formulation is then modified by preparing a set of swellant variants, for example three formulations each containing increasing amounts of swellable functionality, generally by increments of 2 weight percent based on total monomers. For each level of swellable functionality content, prepare three samples of increasing crosslinker content, generally by increments of 0.3 to 2 percent by weight. The resulting polymer series, after being formulated in a suitable mixture of coalescents and plasticizers and other ancillary ingredients, should be applied to an appropriate substrate to be tested. The desired composition can be selected by determining which samples best meet the specific target performance criteria of appearance properties, application properties, resistance to physical and chemical challenges, detergent resistance, and removability using an appropriate stripper solution.

Extent of crosslinking

Intra-molecular reaction can consume multifunctional monomers in competition with the inter-molecular covalent crosslinks which contribute removability to the polymers of this invention. In evaluating sample polymers it is advantageous to be able to establish whether sufficient intermolecular crosslinks are formed in the preparation of the polymer by some means other than formulating and testing a polish for appropriate detergent resistance and removability balance.

'Work Function' or 'Tan $\partial$'

We have found that the presence of sufficient intermolecular crosslinking can be determined from the slope of the high temperature mechanical damping in the rubbery plateau of a sample polymer (the rubbery region above the glass transition temperature of the polymer).

The application of mechanical stress to amorphous polymers results in the storage or absorption of some of the energy and dissipation of some of the energy as heat. The ratio of the dissipated energy to the stored energy is a physically measurable (unitless) quantity called a "work function" or "tan $\partial$". At high temperatures, above the glass transition temperature of the polymer, uncrosslinked or intra-molecularly crosslinked materials lose their resilience and structure as stress is applied, and less of the input energy is stored. Crosslinked materials retain their resiliency so that the input energy can still be dissipated. Thus, the slope of the work function vs. Temperature plot at high temperatures (in the rubbery region above the glass transition temperature of the polymer) is an indication of the degree of productive intermolecular crosslinking in the polymer. The most informative temperature range for this determination is from 135°–150° C. to 170°–185° C. For greater accuracy in determining the slope, the temperature range should extend over a minimum of 25° C. The initial point for the slope is taken at a temperature equal or slightly greater than the minimum in the "tan $\partial$" vs. Temperature curve. This is thoroughly discussed in *Mechanical Properties of Polymers and Composites*, Vol.1, Chapter 4, by E. Lawrence (Marcel Dekker, Inc., New York).

At high levels of inter-molecular crosslinking, the ratio of dissipated to stored energy is insensitive to increases in temperature, or it continues to decrease. Polymers which are crosslinked to this extent, though they can be made to be useful as removable, sacrificial coatings, are sufficiently intractable towards coalescing to form durable films that they are generally not desired, since they can be made to form coherent films only through the use of excessive amounts of solvents.

The preferred range of slopes in the "tan $\partial$" vs. Temperature curve is from $3.00 \times 10^{-3}$ to $-0.20 \times 10^{31}$ $^3$. More preferred is a slope in the range from $1.50 \times 10^{-3}$ to $0.00$. Most preferred is a slope in the range from $0.80 \times 10^{-3}$ to $0.15 \times 10^{-3}$. It will be understood that as the slope decreases the polymer will show greater removability, but it will have a greater solvent demand for forming a coherent film.

Gel Fraction

An alternative means for determining the appropriate level of covalent crosslinking is in the use of gel fractions or percent gel of the polymer. Uncrosslinked amorpheous polymers, or polymers which have been insufficiently crosslinked, or which have not undergone sufficient levels of inter-molecular crosslinking will be highly solvated by appropriate solvents. Because of their reduced free volume, polymers which have been sufficiently crosslinked in an inter-molecular manner will be solubilized to a lesser extent. These less solubilized polymer molecules will be swollen to form a soft gel which can be centrifuged out of the organic solvent solution. Of course, other variables, such as polymer molecular weight, polymer composition, the composition of the solvent selected, and the affinity of the polymer and solvent for each other, will also be seen to influence the gel fraction. For polymers which are comprised of acrylic esters and styrene as the major monomers, tetrahydrofuran (THF) is an appropriate solvent for determining gel fraction. More hydrophylic polymers, such as those comprised of moderately high levels of acidic or non-ionogenic hydrophylic monomers, will be found to be more readily solvated by acetone. Other solvents may be selected as appropriate to the composition of the polymers to be tested, but because the polymer is charged to the solvent from an aqueous emulsion, it should be obvious that it is necessary that water be soluble in the selected solvent, at least to a moderate extent.

Polymers useful as detergent resistant, removable polishes generally have a gel fraction in Acetone greater than 0.60, and more preferably greater than 0.70. Polymers with a gel fraction greater than 0.98 should be considered to be overly crosslinked, but the gel fraction is difficult to establish accurately in this very high range. It may prove more appropriate to determine the solvent demand of the polymer. Polish formulations which require greater than 50% of the total formulation to be coalescing and plasticizing solvent, or greater than 200% of the polymer solids, based on weight, are not considered practicable due to high VOC and the likelihood that the solvent will attack polymeric substrates such as floor tiles.

Other Monomers

Other monomers in the polymer preparation are selected to produce the desired end use and application properties sought and include the polymerizable comonomers which form soft polymers in the presence of free radical catalysts and those that produce hard polymers in the presence of free radical catalysts. Examples of comonomers which polymerize to form soft polymers include primary and secondary alkyl acrylate, with alkyl substituents up to eighteen or more carbon atoms, primary or secondary alkyl methacrylates with alkyl substituents of five to eighteen or more carbon atoms, or other ethylenically-unsaturated compounds which are polymerizable with free radical catalysts to form soft solid polymers, including vinyl esters of saturated monocarboxylic acids of more than two carbon atoms. The preferred ethylenically unsaturated compounds are the stated acrylates, itaconates, and methacrylates, and of these the most preferred esters are those with alkyl groups of not more than 8 carbon atoms.

The preferred monomers which by themselves yield soft polymers may be summarized by the formula

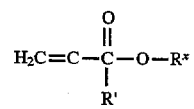

wherein R' is hydrogen or a methyl group and, when R' is methyl R* represents a primary or secondary alkyl group of 5 to 18 carbon atoms, and when R' is hydrogen, R* represents an alkyl group of not over 18 carbon atoms, preferably of 2 to 8 carbon atoms and more preferably 2 to 4 carbon atoms.

Typical compounds coming within the above definition are ethyl acrylate, propyl acrylate, isopropyl acrylate, butyl acrylate, isobutyl acrylate, sec-butyl acrylate, amyl acrylate, isoamyl acrylate, hexyl acrylate, 2-ethylhexyl acrylate, octyl acrylate, 3,5,5-trimethylhexylacrylate, decyl acrylate, dodecyl acrylate, cetyl acrylate, octadecyl acrylate, octadecenyl acrylate, n-amyl methacrylate, sec-amyl methacrylate, hexyl methacrylate, 2-ethylhexyl methacrylate, 2-ethylbutyl methacrylate, octyl methacrylate, 3,5,5-trimethylhexyl methacrylate, decyl methacrylate, dodecyl methacrylate, octadecyl methacrylate, and those with substituted alkyl groups such as butoxyethyl acrylate or methacrylate.

Another group of monomers which by themselves yield soft polymers are butadiene, chloroprene, isobutene, and isoprene. These are monomers commonly used in rubber latices along with a hard monomer also useful in this invention, such as acrylonitrile, styrene, and other hard monomers as given above. The olefin monomers, particularly ethylene and propylene, are also suitable soft monomers.

Examples of polymerizable ethylenically unsaturated monomers which by themselves form hard polymers, are alkyl methacrylates having alkyl groups of not more than four carbon atoms and alkyl acrylates having alkyl groups of not more than 2 carbon atoms, also tert-amyl methacrylate, tert-butyl or tert-amyl acrylate, cyclohexyl, benzyl or isobornyl acrylate or methacrylate, acrylonitrile, or methacrylonitrile, these constituting a preferred group of the compounds forming hard polymers. Styrene, vinyl chloride, chlorostyrene, vinyl acetate and α-methylstyrene, which also form hard polymers, may be used.

Preferred monomers, which by themselves form hard polymers, may be summarized by the formula

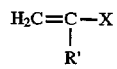

wherein R' is hydrogen or a methyl group and wherein X represents one of the groups —CN, phenyl, methylphenyl, and ester-forming groups, —COOR", wherein R" is cyclohexyl or methyl or ethyl or a tert-alkyl group of four to five carbon atoms, or, when R' is methyl, an alkyl group of two to four carbon atoms. Some typical examples of these have already been named. Other specific compounds are methyl methacrylate, ethyl methacrylate, propyl methacrylate, isopropyl methacrylate, isobutyl methacrylate, n-butyl methacrylate, sec-butyl methacrylate, and tert-butyl methacrylate. Acrylamide and methacrylamide may also be used as hardening components of the copolymer.

A further class of polymers of this invention are polymers of the esters of vinyl alcohol such as vinyl formate, vinyl acetate, vinyl propionate and vinyl butyrate. Preferred is poly(vinyl acetate) and copolymers of vinyl acetate with one or more of the following monomers: vinyl chloride, vinylidene chloride styrene, vinyl toluene, acrylonitrile, methacrylonitrile, acrylate or methacrylate esters, and the functional group containing monomers given above.

These polymers can be prepared, for example by emulsion copolymerization of the several monomers in the proper proportions. Conventional emulsion polymerization techniques are described in U.S. Pat. Nos. 2,754,280 and 2,795,564. Thus the monomers may be emulsified with an anionic, a cationic, or a nonionic dispersing agent, about 0.5% to 10% thereof being used on the weight of total monomers. When water-soluble monomers are used, the dispersing agent serves to emulsify the other, less soluble monomers. A polymerization initiator of the free radical type, such as ammonium or potassium persulfate, may be used alone or in conjunction with an accelerator, such as potassium metabisulfite, or sodium thiosulfate. The initiator and accelerator, commonly referred to as catalyst, may be used in proportions of ½ to 2% each based on the weight of monomers to be copolymerized. The polymerization temperature may be from room temperature to 90° C. or more as is conventional.

Examples of emulsifiers or soaps suited to this polymerization process include alkali metal and ammonium salts of alkyl, aryl, alkaryl, and aralkyl sulfonates, sulfates, and polyether sulfates; the corresponding phosphates and phosphonates; and ethoxylated fatty acids, alcohols, amines, amides, and alkyl phenols.

Staged or sequential copolymers can also be crosslinked according to the invention. Particularly useful first stage copolymers are ethylene/ethylacrylate copolymers and ethylene/vinyl acetate copolymers containing added hydrophilic monomer.

The following examples are provided to illustrate aspects of the invention and should not be construed as limiting the scope of the invention which is disclosed in the specification and claims.

EXAMPLES

Glossary:

In these examples the following terms, symbols and/or abbreviations should be understood to have the meanings shown below. Unless otherwise indicated, all percentages reported are percent by weight (grams of the indicated ingredient per 100 grams of the indicated total). Unless otherwise stated the indicated total is total solids:

AAEMA=Acetylacetoxyethylmethacrylate
ALA=Allylacrylate
ALMA=Allylmethacrylate
BA=Butylacrylate
BGDMA=Butyleneglycoldimethacrylate
DAM=Diallylmaleate
DAP=Diallylphthalate
DVB=Divinylbenzene
HDDA=Hexan-1,6-dioldiacrylate
MAA=Methacrylic Acid
MMA=Methylmethacrylate
MIMAM=Methylolmethacrylamide
St=Styrene
TMPTA=Trimethylolpropanetriacrylate
TMPTMA=Trimethylolpropanetrimethacrylate The following abbreviations and terms are used as indicators of position on scales of ratings used in the various tests reported in the Examples, where "Poor" is the lowest rating and "Excellent" the highest rating. For example: a 5-point scale includes P, F, G, VG, Exc; a 9-point scale includes P, P-F, F, F-G, G, G-VG, VG, VG-Exc, Exc.

P=Poor
P-F=Poor to Fair
F=Fair
F-G=Fair to Good
G=Good
G-VG=Good to Very Good
VG=Very Good
VG-Exc=Very Good to Excellent
Exc=Excellent Test Methods The performance of the polish formulations was tested relative to controls in the standard test methods in use in the industry. These are under the jurisdiction of ASTM Committee D-21 on Polishes, and are collected in Annual Book of ASTM Standards, Section 15, Volume 15.04. The standard test procedure used is listed after the appropriate polish performance property.

| Gloss | ASTM D 1455 |
| --- | --- |
| Recoat Gloss | ASTM D 1455 |
| Water Resistance | ASTM D 1793 |
| Detergent Resistance | ASTM D 3207 |
| | (1/20 dilution of Forward ® in water) |
| Removability | ASTM D 1792 |
| Recoatability | ASTM D 3153 |
| Mark Resistance | ASTM D 3714 |
| Scuff Resistance | ASTM D 3052 |

Polish Formulations

In order to properly evaluate the performance of an emulsion polymer intended for use in as a polish vehicle, it is necessary that the polymer be formulated as a polish. The ingredients used in a floor polish are of two classes. The first class, which consists of the emulsion polymer, wax emulsions, and Alkali Soluble Resins (ASR's), influence the performance of the polish as a dried film. The other class consists of ingredients which serve to aid the formation of a coherent film from the hard emulsion polymer, or they are present to assist in the application of the aqueous polish to the substrate. Though some of the materials in the second classification have an influence on the polish film performance, their role is to mitigate, at best, the performance inherent to the major ingredients of the first class. Of these, the wax emulsions provide lubricity (demonstrated in improved scuff resistance) and slip resistance control to the film. The ASR provides an enhancement of removability (and an equal deterioration in detergent resistance) if used at moderately high levels, but at low levels, such as those used here, its major impact is in improved polish gloss. It also serves to improve the efficiency of the coalescents in assisting the polymer vehicle to form a tough film.

The levels of coalescing and plasticizing solvents used in a polish formulation is dictated by the compatibility of the polymer (overall composition of the polymer) with the selected solvents and the minimum filming temperature of the emulsion polymer. For the emulsion polymer of the examples listed here, the coalescent and plasticizer levels were as given in the formulation details, though minor adjustments were made as was appropriate to ensure that each of the polymer examples formed a glossy, apparently coherent polish film.

The formulation of the crosslinked emulsion polymers of this invention is done in the manner common and well understood to those versed in this art. The ingredients used, and their proportions and manner of addition are the same as is commonly practiced with conventional technology emulsion polymers. The only limitations or differences from current common practice is that care must be taken in the use of ASR's. Since ASR's are charged to the polish formulation as an aqueous ammoniacal solution, there is the potential that the solution will contain excessive amounts of free ammonia. Because of the selective sensitivity of the polymers of this invention toward swelling by ammonia and other amines, this excess ammonia will result in polishes of high viscosity. This high viscosity may result in poor polish leveling performance.

The formulations used in these examples do not include a common polish ingredient, TriButoxy Ethyl Phosphate (Trade name TBEP and KP-140). This is a plasticizer that is used in aqueous polishes as a leveling agent. We have found that the polymers of this invention do not require the use of this ingredient to have excellent leveling performance, though it has no adverse effects on the formulation or resulting polish film if it is included.

The following Formulations were used to prepare polishes for evaluation, unless variations are noted below.

| Material | Function | Parts by Weight |
|---|---|---|
| A. Formulation for All-Acrylic Polymers | | |
| Water | diluent | 33.4 |
| FC-120 (1%) | wetting agent | 2.0 |
| Kathon CG/ICP (1.5%) | biocide | 0.07 |
| DiEthyleneGlycol Ethyl Ether | coalescent | 2.0 |
| DiPropyleneGlycol Methyl Ether | coalescent | 9.0 |
| Texanol | coalescent | 1.0 |
| DiButyl Phthalate | plasticizer | 2.0 |
| Polymer (38%) | vehicle | 55.9 |
| 371 FP N (35%) | wax | 8.0 |
| A-C 325 N (35%) | wax | 2.70 |
| SWS-211 | defoamer | 0.02 |
| Formulation Constants: | | |
| Polymer/ASR/Wax Ratio | | 85/0/15 |
| Theoretical Non-Volatile Solids | | 25.0% |
| B. Formulation for Low and Intermediate Styrenated Acrylic Polymers | | |
| Water | diluent | 27.87 |
| Abex 18s (35%) | viscosity stabilizer | 0.68 |
| FC-120 (1%) | wetting agent | 1.70 |
| Kathon CG/ICP (1.5%) | biocide | 0.03 |
| DiEthyleneGlycol Ethyl Ether | coalescent | 1.70 |
| DiPropyleneGlycol Methyl Ether | coalescent | 8.10 |
| Texanol | coalescent | 0.85 |
| DiButyl Phthalate | plasticizer | 1.70 |
| Polymer (38%) | vehicle | 43.20 |
| Resinall 802 (25%) | ASR | 2.56 |
| 371 FP N (35%) | wax | 7.33 |
| Epolene E-43 N (40%) | wax | 4.26 |
| SWS-211 | defoamer | 0.02 |
| Formulation Constants: | | |
| Polymer/ASR/Wax Ratio | | 77/3/20 |
| Theoretical Non-Volatile Solids | | 23.72% |

| Material | Function | Parts by Weight |
|---|---|---|
| C. Formulation for Highly Styrenated Polymers | | |
| Water | diluent | 26.90 |
| Abex 18s (35%) | viscosity stabilizer | 0.68 |
| FC-120 (1%) | wetting agent | 1.70 |
| Kathon CG/ICP (1.5%) | biocide | 0.03 |
| DiEthylene Glycol Ethyl Ether | coalescent | 1.70 |
| DiPropylene Glycol Methyl Ether | coalescent | 7.67 |
| Texanol | coalescent | 0.85 |
| DiButyl Phthalate | plasticizer | 2.13 |
| Polymer (38%) | vehicle | 43.74 |
| Resinall 802 (25%) | ASR | 4.26 |
| 371 FP N (35%) | wax | 7.76 |
| A-C 325 N (35%) | wax | 2.56 |
| SWS-211 | defoamer | 0.02 |
| Formulation Constants: | | |
| Polymer/ASR/Wax Ratio | | 78/5/17 |
| Theoretical Non-Volatile Solids | | 24.12% |

POLYMER PREPARATION

The following procedure illustrates the conventional gradual addition polymer preparation referred to in the following examples. The monomer proportions are those used to prepare the polymer in Example 1 below. This procedure is referred to in the Examples which follow, and in each case the particular monomers and proportions in the monomer mixture are reported in the individual examples.

Monomer mixture preparation

An emulsified monomer mixture was prepared by slowly adding the following monomers in sequence to a stirred solution of 77 grams of a 28% solution of sodium lauryl sulfate in 2600 grams of deionized water:

| Monomer | weight (grams) | (percent by weight of total monomer) |
|---|---|---|
| butyl acrylate | 1981 | (28.00) |
| methyl methacrylate | 2441 | (34.25) |
| methacrylic acid | 849 | (12.00) |
| styrene | 1769 | (25.00) |
| allyl methacrylate | 53 | (0.75) |

Polymerization Procedure

In a suitable reaction vessel equipped with a thermometer, condenser, and stirrer, a solution of 176 grams of 28% SLS solution and 5150 grams deionized water was heated to 80°–85° C. A 164 gram portion of the monomer emulsion described above was added all at once to the reaction vessel and the temperature adjusted to 80°–82° C. The kettle charge of ammonium persulfate (APS) catalyst solution (41.5 grams dissolved in 200 grams water) was added all at once. Within about five minutes the onset of polymerization was signaled by a temperature rise of 3°–5° C. and a change in the appearance (color and opacity) of the reaction mixture. When the exotherm ceased, the remaining monomer mixture and the cofeed catalyst solution (20.7 grams APS in 600 grams deionized water) were gradually added to the reaction vessel. The rate of addition was chosen based on the rate at which the heat of the polymerization reaction could be removed by cooling (2–3 hrs). The polymerization reaction temperature was maintained at 80°–84° C. by cooling as necessary. When the additions were completed, the monomer mixture and catalyst containers and feed lines were rinsed to the kettle with water. The batch was cooled to ambient temperature for dilution to 38% total solids, pH adjustment, and storage. The pH was adjusted with an aqueous ammonia/ammonium bicarbonate solution to pH 7.0 to 8.0 to improve the emulsion viscosity stability during storage and to compatabilize it with the other ingredients used in formulating the emulsion polymer into a polish.

EXAMPLE 1

A polymer dispersion (Example 1-A) was prepared in a conventional, gradual addition process, from a monomer emulsion containing the following ratio of monomers: 28 BA/34.25 MMA/25 St/12 MAA/0.75 ALMA. The final product of the reaction had 38% total solids and a pH of 5.5, which was adjusted to 7.5 with aqueous ammonia. A companion polymer dispersion (Comparative 1-B) was prepared for comparison with a monomer ratio of 28 BA/35 MMA/25 St/12 MAA. The resulting Comparative Polymer (1-B) at 38% total solids was divided into two portions. In one portion the pH was adjusted to 7.4 with aqueous ammonia. The second portion of Comparative Product (B) was post treated with 3.2% by weight Zinc (calculated as metal on polymer solids), in the form of a tetra-ammino Zinc Bicarbonate complex. The resulting metal crosslinked Comparative Product (1-C) had a pH of 8.8 and 38% total solids.

The Example 1-A Polymer was covalently crosslinked and metal-free; the Comparative Polymer C was zinc-crosslinked according to prior art techniques; and the Comparative Polymer B was a polymer without covalent or metal crosslinking. The three polymers were formulated into floor finishes in similar formulations, and the polishes were tested for performance properties in accordance with standard test method procedures. The results are reported in Table 1.

TABLE 1

| Polymer | Example 1-A | Comparative Examples 1-B | 1-C |
|---|---|---|---|
| Crosslink | ALMA | None | Zinc |
| Gloss | VG | VG | G–VG |
| Recoat Gloss | Exc | Exc | VG–Exc |
| Recoatability | Exc | Exc | Good |
| Film Formation | Exc | Exc | Exc |
| Water Resistance | Exc | Exc | Exc |
| Detergent Resistance | VG–Exc | VG–Exc | VG–Exc |
| Removability (%) | Exc/100 | Poor/0 | VG–Exc/85 |
| Scuff Resistance | VG | VG | VG |
| Mark Resistance | G–VG | G–VG | VG |

The low level of covalent crosslinking with Allyl Methacrylate (ALMA) in the Example 1-A polymer provides the polish formulated from the Example 1-A polymer with improved removability relative to the Comparative Polymer B which has no crosslinker. The polish formulated from the Example 1-A Polymer showed much improved recoatability and slightly improved removability compared to the conventional Zinc-crosslinked Comparative Polymer C, without the reduced gloss caused by the zinc metal in Comparative Polymer C.

EXAMPLE 2

A series of all-acrylic polymer dispersions were made in the conventional, gradual addition manner, from a monomer emulsion containing the following ratio of monomers: 28 BA/ (60- X) MMA/12 MAA/X crosslinking monomer, where X is a charge of poly-functional monomer capable of forming covalent crosslinks by free radical reaction of multiple olefinic unsaturation sites. The reaction products were adjusted to 38% total solids and pH 7.5–8.0 with aqueous ammonia. A Comparative Polymer (2-E) with no covalent crosslinking monomer was also prepared and was post-treated with 2.4% Zinc, as tetra-ammino Zinc Carbonate complex. These polymers were formulated into similar polish formulations and the polishes were tested for performance properties in accordance with standard test method procedures. The results are reported in Table 2.

TABLE 2

| Polymer | 2-A | 2-B | 2-C | 2-D | Comparative 2-E | 2-F | 2-G |
|---|---|---|---|---|---|---|---|
| X-Monomer | DVB | HDDA | TMPTA | ALMA | 0 (Zn) | BGDMA | DAP |
| X Charge | 4.0 | 4.0 | 0.65 | 0.65 | None | 4.0 | 2.0 |
| Gloss | G–VG | G–VG | G–VG | G–VG | Good | G–VG | G–VG |
| Recoat Gloss | VG | VG | VG | VG | VG | VG | VG |
| Recoatability | Exc | Exc | Exc | Exc | Good | Exc | Exc |
| Film Formation | Exc | VG–Exc | VG–Exc | Exc | Exc | Exc | Exc |
| H₂O Resistance | Exc | Exc | Exc | Exc | VG | Exc | Exc |
| Detergent Resistance | VG–Exc | VG–Exc | Exc | Exc | VG–Exc | Exc | Exc |
| Removability/(%) | Poor/0 | Fair/30 | Poor/0 | Exc/100 | VG–Exc/90 | Poor/5 | Poor/0 |
| Scuff Resistance | VG–Exc | VG–Exc | VG–Exc | VG–Exc | VG–Exc | VG–Exc | VG–Exc |
| Mark Resistance | VG | VG | VG | VG | VG–Exc | VG | VG |

All of the polymers had improved water resistance, recoatability and gloss relative to the Comparative Polymer 2-E. ALMA (Example 2-D), is the only monomer in this example that contains reactive groups of substantially different reactivity. All of the other covalent crosslinking monomers of the example have multiple reactive groups having equal or equivalent reactivity. All of the covalently crosslinked polymers, with the exception of ALMA, had unacceptable removability, and the removability of each was similar to Example 1-B, which had no covalent crosslinker and no Zinc additive.

EXAMPLE 3

A series of all-acrylic polymer dispersions were made in the conventional, gradual addition manner, from a monomer emulsion containing the following ratio of monomers: 28 BA/(60-X) MAA/X ALMA, where X was varied from 0.25 to 1.25. The reaction products were adjusted to 38% total solids and pH 7.5–8.0 with aqueous ammonia. These polymers were formulated into similar polish formulations and the polishes were tested for performance properties in accordance with standard test method procedures. The results are reported in Table 3.

TABLE 3

| Polymer | 3-A | 3-B | 3-C | 3-D | Comparative 3-E |
|---|---|---|---|---|---|
| ALMA Charge (%) | 0.25 | 0.65 | 1.00 | 1.25 | 0 (Zn) |
| Gloss | G-VG | G-VG | G-VG | G-VG | Good |
| Recoat Gloss | VG | VG | VG | VG | VG |
| Recoatability | Exc | Exc | Exc | Exc | Good |
| Film Formation | Exc | Exc | G-VG | Fair | Exc |
| $H_2O$ Resistance | Exc | Exc | VG | Good | VG |
| Detergent Resistance | Exc | Exc | G-VG | Good | VG-Exc |
| Removability(%) | Fair/30 | Exc/100 | Exc/100 | Exc/100 | VG-Exc/90 |
| Scuff Resistance | VG-Exc | VG-Exc | VG-Exc | VG | VG-Exc |
| Mark Resistance | VG | VG | VG | VG | VG-Exc |

The balance of polish detergent resistance and removability performance is maximized, and most closely approximates that of the metal crosslinked polish of a similar polymer composition at 0.65% ALMA. When the level of covalent crosslinking monomer is decreased significantly below this level, the polish removability becomes unacceptable. When the level of covalent crosslinking monomer is increased significantly above this level then polish film formation suffers, as does the polish detergent resistance. With polymer 3-C we found that an increase in the formulation coalesceing solvents (DiEthylene Glycol Methyl Ether) induced better film formation, but we were not able to induce sufficiently good film formation to polymer 3-D to improve the detergent resistance. A similar increase in the level of coalescent, as described above for polymer 3-C, but with polymer 3-B resulted in a small loss in polish removability (VG-Exc/90).

EXAMPLE 4

A polymer dispersion (4-A) was prepared in the conventional, gradual addition manner, from a monomer emulsion containing the following ratio of monomers: 28 BA/60 MMA/10 MAA/2 AAEMA. Acetyl Acetoxy Ethyl Methacrylate (AAEMA) is capable of producing covalent crosslinks through a condensation reaction with Formaldehyde, similar to an aldol condensation. To an aliquot of polymer emulsion 4-A was added 0.5 equivalents of Formaldehyde, and to a separate aliquot was added 1.0 equivalents of Formaldehyde. These modified samples were designated polymers 4-B and 4-C, respectively. A control polymer was prepared with the composition 28 BA/61.45 MMA/10 MAA/0.55 ALMA, and this was designated 4-D. The polymers were formulated, in similar mixtures, into floor finishes, and were tested for performance properties in accordance with standard test method procedures. The results are reported in Table 4.

TABLE 4

| Polymer | 4-A | 4-B | 4-C | 4-D |
|---|---|---|---|---|
| Monomer charge | AAEMA 2.0 | AAEMA 2.0 | AAEMA 2.0 | ALMA 0.55 |
| Formaldehyde | none | 0.5 | 1.0 | none |
| Gloss | G-VG | G-VG | G-VG | G-VG |
| Recoat Gloss | VG | VG | VG | VG |
| Recoatability | Exc | Exc | Exc | Exc |
| Film Formation | Exc | Exc | Exc | Exc |
| Water Resistance | Exc | Exc | Exc | Exc |
| Detergent Resistance | VG-Exc | VG-Exc | VG-Exc | Exc |

TABLE 4-continued

| Polymer | 4-A | 4-B | 4-C | 4-D |
|---|---|---|---|---|
| Removability(%) | Poor/10 | Poor/10 | Poor/10 | Exc/100 |
| Scuff Resistance | VG | VG | VG | VG-Exc |
| Mark Resistance | Good | Good | Good | VG |

Though the AAEMA is reported to undergo a facile, low temperature condensation reaction with Formaldehyde, it appears from the room temperature performance data that no appreciable reaction has taken place. The absence of intermolecular crosslinking is demonstrated by the equal (poor) removability in the AAEMA series. The above samples were heat treated to induce complete reaction of the crosslinking Formaldehyde by holding the polish coated tiles at 50° C. for seven days, and then testing them for performance properties. The results are reported in Table 5.

TABLE 5

| Polymer | 4-A | 4-B | 4-C | 4-D |
|---|---|---|---|---|
| Monomer charge | AAEMA 2.0 | AAEMA 2.0 | AAEMA 2.0 | ALMA 0.55 |
| Formaldehyde | none | 0.5 | 1.0 | none |
| Gloss | G-VG | G-VG | G-VG | G-VG |
| Recoat Gloss | VG | VG | VG | VG |
| Recoatability | Exc | Exc | Exc | Exc |
| Film Formation | Exc | Exc | VG-Exc | Exc |
| Water Resistance | Exc | Exc | Exc | Exc |
| Detergent Resistance | VG-Exc | VG-Exc | Exc | Exc |
| Removability(%) | Poor/10 | Poor/10 | Poor/0 | Exc/100 |
| Scuff Resistance | VG | VG | VG-EXC | VG-Exc |
| Mark Resistance | Good | G-VG | G-VG | VG |

When the reaction was induced by heating of the dried polish films, there was no improvement in polish removability. That a reaction occured was evidenced by small improvements in mark resistance and, at the higher Formaldehyde levels, scuff resistance and detergent resistance. The slight reduction in removability of the high Formaldehyde, heat cured sample, 4-C, is consistent with the expectation that post-crosslinking of polish films will increase the resistance of the polish film to softening, swelling, and attack by chemicals, including ammoniated stripper solutions.

EXAMPLE 5

A polymer dispersion was prepared in low temperature, redox initiated, gradual addition manner, from a monomer emulsion containing the following ratio of monomers: 28 BA/60 MMA/10 MAA/2 MIMAM. Methylolmethacrylamide (MIMAM) is known to undergo self condensation through the pendant methylol group to form covalent crosslinks. This reaction is readily induced by heat, and can be controlled such that either pre- or post- crosslinking can be attained. Pre-crosslinking of the emulsion is avoided by running the polymerization reaction at reduced temperatures, and post-crosslinking may then be induced by heating the polymer film to the reaction temperature. An aliquot of polymer 5-A was heated at 65° C. for ten days to induce intermolecular crosslinking, and was designated as polymer 5-B. Both samples were formulated into polishes in similar formulations. Separate sets of tiles were coated with the two formulations and one set was heated to 50° C. for twenty days. These are designated as polish samples 5-A' and 5-B', respectively. All of the polishes were then tested for performance properties in accordance with standard test method procedures. The results are reported in Table 6. In the data following the designation of heat treatment, 'pre' indicates heating before application, 'post' indicates heating as a film.

TABLE 6

| Polymer | 5-A | 5-B | 5-A' | 5-B' |
| --- | --- | --- | --- | --- |
| Monomer | MIMAM | MIMAM | MIMAM | MIMAM |
| heat treatment | none | pre | post only | pre and post |
| Gloss | G-VG | G-VG | G-VG | G-VG |
| Recoat Gloss | VG | VG | VG | VG |
| Recoatability | Exc | Exc | Exc | Exc |
| Film Formation | Exc | Exc | VG-Exc | Exc |
| Water Resistance | Exc | Exc | Exc | Exc |
| Detergent Resistance | VG-Exc | VG-Exc | Exc | Exc |
| Removability(%) | Poor/10 | Exc/100 | Poor/0 | Exc/100 |
| Scuff Resistance | VG | VG | VG-EXC | VG-Exc |
| Mark Resistance | Good | G-VG | G-VG | VG |

Precrosslinking of the emulsion polymer (5-B) resulted in a dramatic improvement in polish film removability, relative to the same polymer (5-A) which had not been allowed to crosslink. As expected, when the sample 5-A was crosslinked after film formation, there was an improvement in detergent resistance, scuff resistance, and mark resistance, but no significant change in polish removability. In fact, the polish removability was slightly worse, again in keeping with expectations. Sample 5-B, when heated as a film, could undergo no further crosslinking reactions to any significant extent, so removability was unchanged.

EXAMPLES 6 to 39

Additional experiments were conducted to examine the amount of crosslinking monomers that produced the desired properties when incorporated into different copolymers. The data below is reported in groups with identification of the copolymer composition reported at the beginning of each set. The type and amount of crosslinking monomer is reported along with test results in tabular form.

Tan ∂ vs. Temperature Curves

"Tan ∂" vs. Temperature curves were obtained for the following polymers using a Rheometrics Dynamic Spectrometer, Model No. 7700 (manufactured by Rheometrics, Inc., Piscataway, N.J. The unformulated emulsion samples were cast in petri dishes and air dried at room temperature for several days. The solid material was analyzed in a parallel plate geometry with temperature programmed downward from 180° C. to approximately 70° C. Data points were collected at each temperature of interest after equilibration at that temperature for 5 minutes. The stress frequency was 6.3 radians/second, and the strain amplitude was 5%.

EXAMPLES 6 to 26

All Acrylic Polymers

Polymer Composition: 26 BA/(62-X)MMA/12 MAA/X.Z, where X is the amount of multifunctional crosslinking monomer Z. The results are reported in Table 7. The abbreviation "DR" designates the results from testing for polish Detergent Resistance.

TABLE 7

| # | X | Z | Slope ($\times 10^{-3}$) | DR | Removability |
| --- | --- | --- | --- | --- | --- |
| 6 | 0.00 | none | 7.54 | VG-Exc | Poor/0% |
| 7 | 0.65 | ALA | 1.16 | VG-Exc | VG-Exc/90 |
| 8 | 0.10 | ALMA | 2.20 | Exc | Fair/30 |
| 9 | 0.20 | ALMA | 1.05 | Exc | VG-Exc/90 |
| 10 | 0.40 | ALMA | 0.55 | VG-Exc | Exc/100 |
| 11 | 0.50 | ALMA | 0.31 | VG-Exc | Exc/100 |
| 12 | 1.50 | ALMA | -0.53 | Fair | Exc/100 |
| 13 | 1.90 | BGDMA | 5.46 | Exc | Poor/10 |
| 14 | 4.00 | BGDMA | 4.66 | Exc | Fair/30 |
| 15 | 6.00 | BGDMA | 3.90 | VG-Exc | F-G/50 |
| 16 | 8.25 | BGDMA | 1.36 | VG-Exc | VG/80 |
| 17 | 1.90 | DVB | 2.85 | Exc | Poor/0 |
| 18 | 4.00 | DVB | 1.21 | VG-Exc | Poor/0 |
| 19 | 6.00 | DVB | 0.20 | VG-Exc | VG-Exc/85 |
| 20 | 1.00 | DAM | 1.53 | VG-Exc | Good/70 |
| 21 | 1.90 | DAM | 0.71 | VG-Exc | Exc/100 |
| 22 | 1.90 | DAP | 2.92 | Exc | Poor/0 |
| 23 | 4.00 | DAP | 1.65 | VG-Exc | Fair/40 |
| 24 | 6.00 | DAP | 0.57 | VG-Exc | Exc/95 |
| 25 | 1.90 | HDDA | 4.53 | Exc | Poor/0 |
| 26 | 7.60 | HDDA | -0.06 | VG-Exc | Exc/100 |

EXAMPLES 27 to 30

HIGH TG STYRENATED ACRYLIC POLYMERS

Polymer Composition: 15 BA/(42-X)Styrene/28 MMA/15 MAA/X.Z, where X is the amount of multifunctional crosslinking monomer Z. The results are reported in Table 8.

TABLE 8

| # | X | Z | Slope ($\times 10^{-3}$) | DR | Removability |
| --- | --- | --- | --- | --- | --- |
| 27 | 0.00 | none | 7.54 | Exc | Poor/0 |
| 28 | 0.50 | DAM | 2.45 | Exc | Good/75 |
| 29 | 1.00 | DAM | 0.84 | Exc | Exc/100 |
| 30 | 1.90 | DAM | -1.15 | Poor | Exc/100 |

EXAMPLES 31 to 33

HIGHLY STYRENATED ACRYLIC POLYMERS

Polymer Composition: 28 BA/47 Styrene/(11.5-X)MMA/12 MAA/X.Z, where X is the amount of multifunctional crosslinking monomer Z. The results are reported in Table 9.

TABLE 9

| # | X | Z | Slope ($\times 10^{-3}$) | DR | Removability |
| --- | --- | --- | --- | --- | --- |
| 31 | 0.00 | none | 9.60 | Exc | Poor/0 |
| 32 | 0.75 | ALMA | 3.45 | Exc | Fair/25 |
| 33 | 1.50 | ALMA | -0.53 | VG-Exc | VG-Exc/85 |

EXAMPLES 34 to 36

LOW TG STYRENATED ACRYLIC POLYMERS

Polymer Composition: 40 BA/25 Styrene/(21.5-X)MMA/12 MAA/X.Z, where X is the amount of multifunctional crosslinking monomer Z. The results are reported in Table 10.

TABLE 10

| # | X | Z | Slope (× 10⁻³) | DR | Removability |
|---|------|------|-------|------|----------|
| 34 | 0.00 | none | 8.22 | Exc | Poor/0 |
| 35 | 0.75 | ALMA | 1.81 | Exc | Exc/100 |
| 36 | 1.50 | ALMA | −0.24 | Good | Exc/100 |

EXAMPLES 37 to 39

Low Tg All Acrylic Polymers

Polymer Composition: 43 BA/(43-X) MMA/14 MAA/X.Z, where X is the amount of multifunctional crosslinking monomer Z. The results are reported in Table 11.

TABLE 11

| # | X | Z | Slope (× 10⁻³) | DR | Removability |
|---|------|-------|------|-----|----------|
| 37 | 0.00 | none | 5.28 | Exc | Poor/0 |
| 38 | 0.50 | ALMA | 0.31 | Exc | Exc/100 |
| 39 | 1.90 | TMPTMA | 3.89 | Exc | Poor/10 |

Gel Fraction Data

Gel fraction analysis was performed on some of the polymers from the preceding examples. Gel fraction is determined by charging a weighed aliquot of solvent (Wv) to a weighed sample of the polymer emulsion (Wp) of known solids content (Ws) in a centrifuge tube. The mixture is stirred overnight and then ultra-centrifuged. A weighed aliquot of the supernatent solution is then evaporated to solids. The fraction solids of the supernatent solution (Ss) is determined.

The soluble fraction is determined from:

Soluble Fraction=[Ss×(Wv+Wp−Ws)]/(Ws)

and

Gel Fraction=1-Soluble Fraction.

All Acrylic Polymers

Polymer Composition: 26 BA/(62-X)MMA/12 MAA/X.Z, where X is the amount of multifunctional crosslinking monomer Z. The results are reported in Table 12.

TABLE 12

| # | X | Z | Solvent | Gel Fraction | DR | Removability |
|---|------|-------|---------|------|--------|----------|
| 6 | 0.00 | none | Acetone | 0.00 | VG-Exc | Poor/0% |
| 8 | 0.10 | ALMA | Acetone | 0.56 | Exc | Fair/30 |
| 9 | 0.20 | ALMA | Acetone | 0.75 | Exc | VG-Exc/90 |
| 10 | 0.40 | ALMA | Acetone | 0.91 | VG-Exc | Exc/100 |
| 13 | 1.90 | BGDMA | Acetone | 0.00 | Exc | Poor/10 |
| 14 | 4.00 | BGDMA | Acetone | 0.22 | Exc | Fair/30 |
| 15 | 6.00 | BGDMA | Acetone | 0.47 | VG-Exc | F-G/50 |
| 16 | 8.25 | BGDMA | Acetone | 0.68 | VG-Exc | VG/80 |
| 25 | 1.90 | HDDA | Acetone | 0.25 | Exc | Poor/0 |
| 26 | 7.60 | HDDA | Acetone | 0.66 | VG-Exc | Exc/100 |

Low Tg Styrenated Acrylic Polymers

Polymer Composition: 40 BA/25 Styrene/(21.5-X) MMA/12 MAA/X.Z, where X is the amount of multifunctional crosslinking monomer Z. The results are reported in Table 13.

TABLE 13

| # | X | Z | Solvent | Gel Fraction | DR | Removability |
|---|------|------|---------|------|------|----------|
| 34 | 0.00 | none | Acetone | 0.05 | Exc | Poor/0 |
| 35 | 0.75 | ALMA | Acetone | 0.85 | Exc | Exc/100 |
| 36 | 1.50 | ALMA | Acetone | 0.96 | Good | Exc/100 |

Low Tg All Acrylic Polymers

Polymer Composition: 43 BA/(43-X) MMA/14 MAA/X.Z, where X is the amount of multifunctional crosslinking monomer Z. The results are reported in Table 14.

TABLE 14

| # | X | Z | Solvent | Gel Fraction | DR | Removability |
|---|------|------|---------|------|-----|----------|
| 37 | 0.00 | none | Acetone | 0.00 | Exc | Poor/0 |
| 38 | 0.50 | ALMA | Acetone | 0.81 | Exc | Exc/100 |
| 39 | 1.90 | TMPTMA | Acetone | 0.60 | Exc | Poor/10 |

We claim:

1. A floor polish comprising an aqueous emulsion of film-forming polymer particles that contain polymer functional groups that interact with chemical swellants and which polymer particles are covalently crosslinked with multi-functional monomer or reagent before film formation to a degree effective to impede interparticle attachments during film formation, said polymer particles containing an effective amount of said functional groups greater than the amount effective to absorb sufficient chemical swellant to expand the particles to a degree that disrupts interparticle and film/substrate attachments in said film to an extent that permits removal of the film.

2. An amine-strippable, detergent resistant floor polish comprising an emulsion of polymer particles which contain from about 6% to about 20% by weight acid-functional monomer and from about 0.2 to about 0.8 percent by weight multifunctional-crosslinking monomer.

3. A floor polish according to claim 2 wherein the emulsion is essentially free of polyvalent metal ionic crosslinkers or residues thereof.

4. A process of making a floor polish comprising:
   a) preparing an emulsion of particles of swellable polymer from a polymer which contains from 3% to about 30% by weight swellant-attracting functional monomer and
   b) covalently crosslinking the polymer with a multifunctional monomer before the emulsion forms a film, to an extent that the slope of the tan $\partial$ versus temperature curve in the rubbery plateau of the unformulated polymer emulsion is from about −0.10 to about 2.50.

5. A process of making a floor polish comprising:
   a) preparing an emulsion of particles of swellable polymer from a polymer which contains from 3% to about 30% by weight swellant-attracting functional monomer and
   b) covalently crosslinking the polymer with a multifunctional monomer before the emulsion forms a film, to an extent that the polymer emulsion has a gel fraction in acetone solvent of from greater than about 0.60 to less than about 0.95.

* * * * *